(12) United States Patent
Ozawa et al.

(10) Patent No.: US 6,771,420 B2
(45) Date of Patent: Aug. 3, 2004

(54) OPTICAL DEVICE WITH BARRIER LAYER, OPTICAL SYSTEM, AND PROJECTOR APPARATUS

(75) Inventors: Naoki Ozawa, Saitama (JP); Atsushi Enomoto, Saitama (JP); Kenji Yasuda, Saitama (JP); Yoshio Kojima, Sagamihara (JP); Satoru Moriya, Noda (JP); Masanobu Shigeta, Yokosuka (JP); Toshiya Sakuma, Tokyo (JP)

(73) Assignees: Fuji Photo Optical Co., Ltd., Saitama (JP); Victor Company of Japan, Ltd., Yokohama (JP)

( * ) Notice: Subject to any disclaimer, the term of this patent is extended or adjusted under 35 U.S.C. 154(b) by 29 days.

(21) Appl. No.: 10/327,930

(22) Filed: Dec. 26, 2002

(65) Prior Publication Data

US 2003/0137738 A1 Jul. 24, 2003

(30) Foreign Application Priority Data

Jan. 18, 2002 (JP) .................................... 2002-010767

(51) Int. Cl.⁷ ................................................. G02B 1/10
(52) U.S. Cl. ........................ 359/586; 359/577; 359/583; 359/588
(58) Field of Search ................................. 359/586–590, 359/583

(56) References Cited

U.S. PATENT DOCUMENTS

| 5,680,001 A | * | 10/1997 | Mulder et al. ............... 313/110 |
| 6,110,607 A | * | 8/2000 | Montcalm et al. ........... 428/641 |
| 2003/0043464 A1 | * | 3/2003 | Dannenberg ................. 359/585 |

FOREIGN PATENT DOCUMENTS

| JP | 2000-275402 | * | 10/2000 |
| JP | 2001-356297 | | 12/2001 |

\* cited by examiner

*Primary Examiner*—Drew A. Dunn
*Assistant Examiner*—Leo Boutsikaris
(74) *Attorney, Agent, or Firm*—Snider & Associates; Ronald R. Snider

(57) ABSTRACT

An optical device has a light-transmitting optical substrate formed with a multilayer film and a barrier layer disposed on the multilayer film side thereof. The light-transmitting optical substrate has a refractive index $N_s$ (at a reference wavelength of 632.8 nm) falling within the range of $1.7 \leq N_s \leq 1.9$, whereas the barrier layer has a refractive index $N_b$ (at a reference wavelength of 632.8 nm) falling within the range of $-0.1 \leq N_b - N_s \leq 0.1$.

10 Claims, 7 Drawing Sheets

EXAMPLE 1
SPECTRAL TRANSMISSION CHARACTERISTIC

EXAMPLE 1
PHASE DIFFERENCE CHARACTERISTIC

EXAMPLE 2
SPECTRAL REFLECTION CHARACTERISTIC

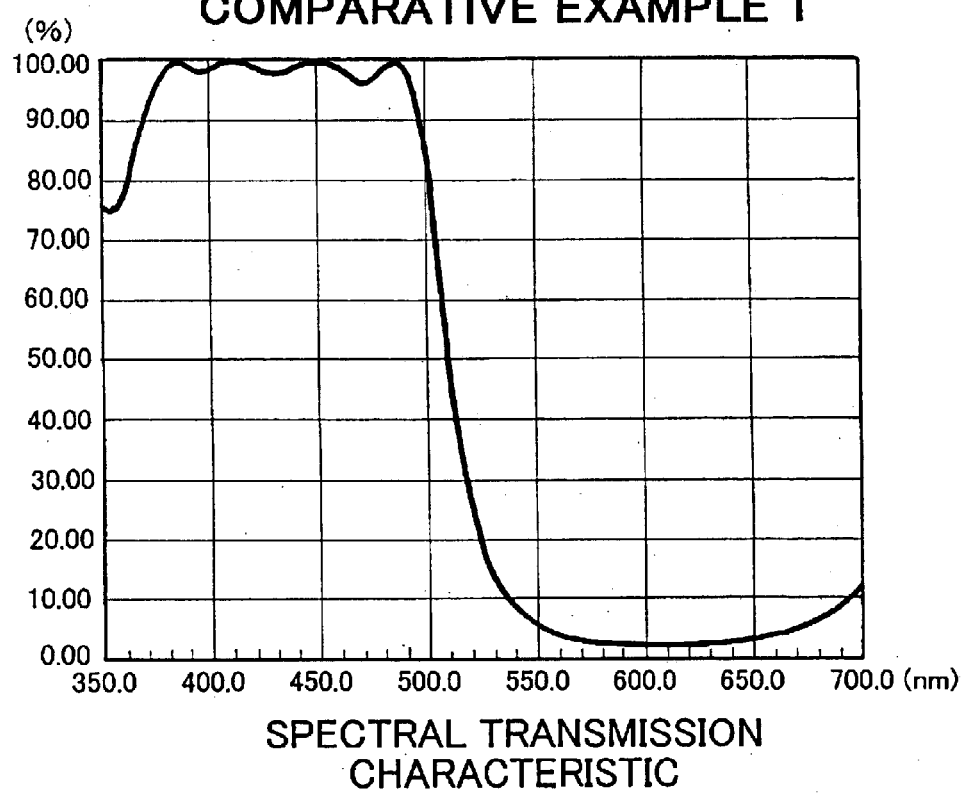
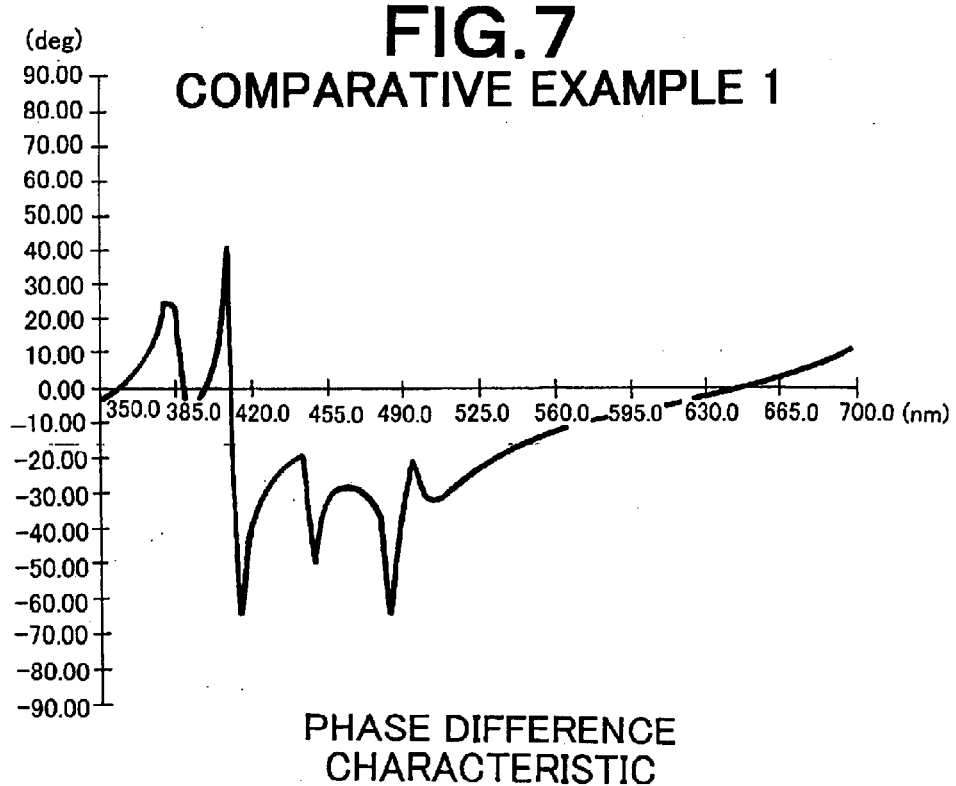

COMPARATIVE EXAMPLE 2
SPECTRAL TRANSMISSION CHARACTERISTIC

COMPARATIVE EXAMPLE 2
PHASE DIFFERENCE CHARACTERISTIC

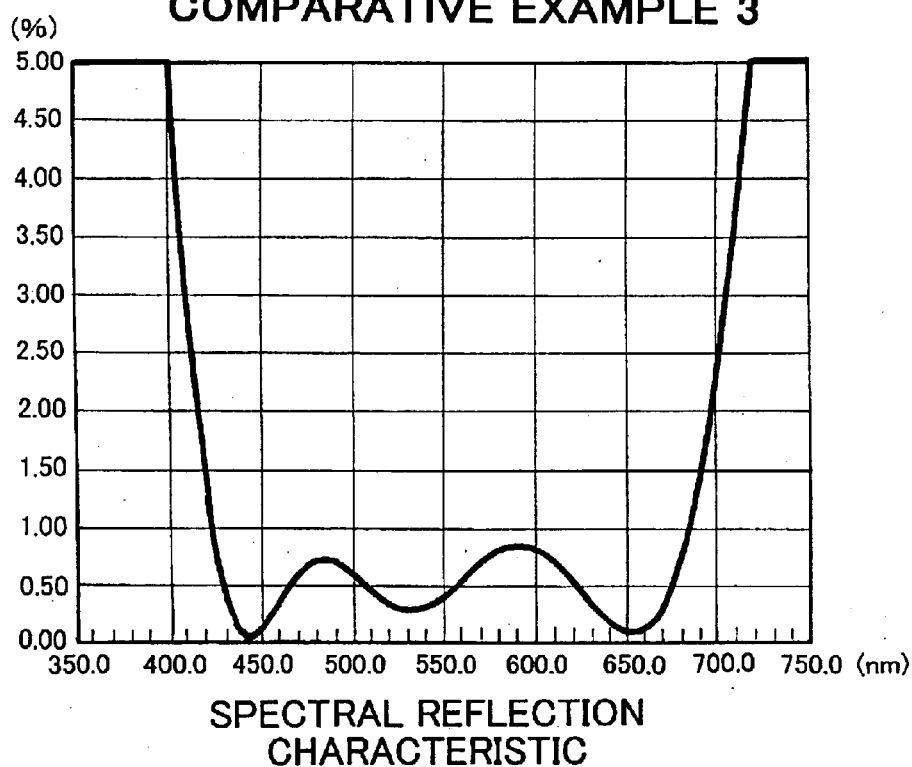
FIG.10 COMPARATIVE EXAMPLE 3
SPECTRAL REFLECTION CHARACTERISTIC
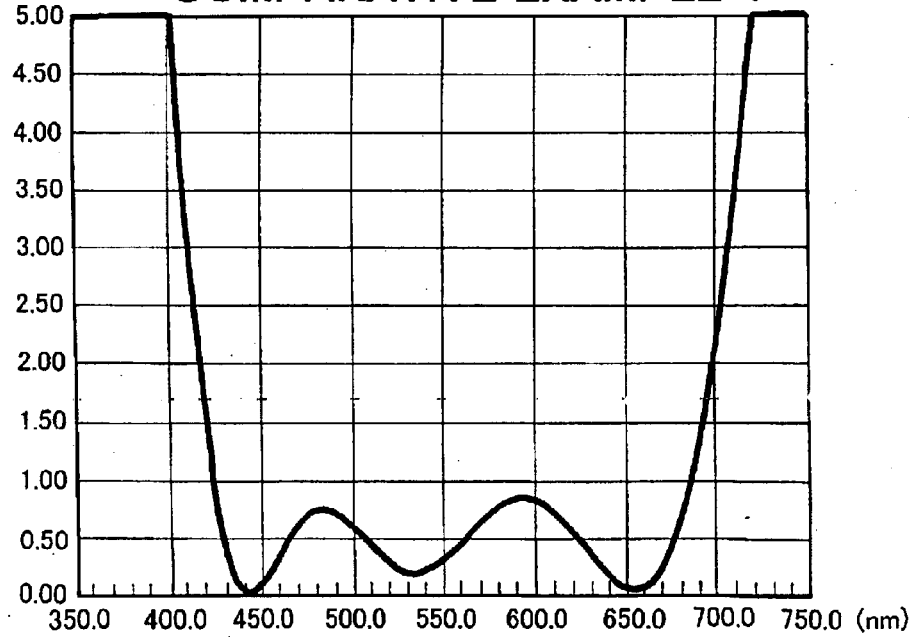
FIG.11 COMPARATIVE EXAMPLE 4
SPECTRAL REFLECTION CHARACTERISTIC

OPTICAL DEVICE WITH BARRIER LAYER, OPTICAL SYSTEM, AND PROJECTOR APPARATUS

RELATED APPLICATIONS

This application claims the priority of Japanese Patent Application No. 2002-010767 filed on Jan. 18, 2002, which is incorporated herein by reference.

BACKGROUND OF THE INVENTION

1. Field of the Invention

The present invention relates to an optical device in which a multilayer film is formed on a transparent substrate provided with a barrier layer, an optical system using this optical device, and a projector apparatus using the same. In particular, the present invention relates to an optical device, an optical system, and a projector apparatus which are suitable when the multilayer film functions as a dichroic film or the like.

2. Description of the Prior Art

In an illumination optical system/color-combining optical system of a color liquid crystal projector apparatus or the like, for example, a color-decomposing or -combining prism provided with a dichroic multilayer film for decomposing light source light into three colors or combining individual modulated light components from respective light valves has conventionally been in use.

Such a dichroic multilayer film is required to maintain a favorable spectral characteristic and a phase difference characteristic over the whole visible light wavelength region in a state irradiated with strong light source light.

On the other hand, a glass substrate formed with the dichroic multilayer film, i.e., prism, is required to have a low photoelastic coefficient and a low optical absorption index in order to maintain a favorable polarizing state, whereby a glass material containing a large amount of PbO and the like is used as its constituent material.

However, such a prism is continuously irradiated with strong light source light (light on the shorter wavelength side in particular), whereby molecules of Pb or the like contained in the prism are likely to diffuse into the dichroic multilayer film and may reach the uppermost layer thereof in some cases. In such a case, molecules of Pb or the like react with those of Ti or the like in $TiO_2$, for example, constituting the dichroic multilayer film, thereby blackening $TiO_2$ or the like, which may increase the optical absorption index of the dichroic multilayer film.

As measures against such a problem, a barrier layer may be disposed on the glass substrate so as to inhibit molecules from dispersing between the glass substrate and multilayer film.

Conventionally known as an optical device using a barrier layer is one in which a barrier layer made of $MgF_2$ or $SiO_2$ is interposed between a substrate and an antireflection multilayer film in order to inhibit reactions from occurring in a boundary between the substrate and the antireflection multilayer film, thereby suppressing optical absorption in the vicinity of the boundary Japanese Unexamined Patent Publication No. 2000-275402).

If the prior art mentioned above is employed for overcoming the problem mentioned above, the barrier layer may disorder the spectral characteristic and phase difference characteristic, whereby the product may become inferior in terms of performances as a color-decomposing or -combining prism or the like for a color liquid projector apparatus required to have a favorable spectral characteristic over the whole visible light region and a phase difference characteristic which can maintain a polarizing state.

If the thickness of the barrier layer in the above-mentioned prior art is adjusted such that the multilayer film and barrier layer attain favorable spectral and phase difference characteristics in total, the barrier layer will be too thin (e.g., several to ten-odd nanometers) to function as a barrier layer.

When a film is to be designed as a combination of the multilayer film and barrier layer, care must be taken so as not to affect functions of the multilayer film, whereby it becomes harder to design, thus taking a large amount of time and cost for development.

SUMMARY OF THE INVENTION

It is an object of the present invention to provide an optical device formed with a multilayer film and a barrier layer on the multilayer film side, which can attain favorable spectral and phase difference characteristics while favorably maintaining functions as the barrier layer, and save the time and cost for designing the film.

It is another object of the present invention to provide an optical system using such an optical device.

It is further object of the present invention to provide a projector apparatus using such an optical device.

The present invention provides an optical device comprising a light-transmitting optical substrate formed with a multilayer film and a barrier layer disposed on the multilayer film side thereof;

wherein the light-transmitting optical substrate has a refractive index $N_s$ (at a reference wavelength of 632.8 nm) falling within the range of $1.7 \leq N_s \leq 1.9$; and wherein the barrier layer has a refractive index $N_b$ (at a reference wavelength of 632.8 nm) falling within the range of $-0.1 \leq N_b - N_s \leq 0.1$.

Preferably, in the optical device, the barrier layer is constituted by $La_{2x}Al_{2y}O_{3(x+y)}$, where $0.5 \leq x$, and $y \leq 1.5$.

Preferably, the barrier layer has a physical film thickness of at least 20 nm.

Preferably, the light-transmitting optical substrate is constituted by a glass material containing at least 50% by weight of at least one of PbO, $Nb_2O_5$, and $TiO_2$.

Preferably, the value of $N_b - N_s$ falls within the range of +0.05.

Preferably, the multilayer film comprises alternately laminated $TiO_2$ and $SiO_2$ layers.

The present invention provides an optical system comprising the optical device mentioned above.

Here, the multilayer film may be a dichroic film.

The present invention provides a projector apparatus comprising the optical device mentioned above.

Here, the multilayer film may be a dichroic film.

BRIEF DESCRIPTION OF THE DRAWINGS

FIG. 6 is a chart showing the spectral transmission characteristic of the dichroic multilayer film in accordance with Comparative Example 1;

FIG. 7 is a chart showing the phase difference characteristic of reflected light in the dichroic multilayer film in accordance with Comparative Example 1;

FIG. 10 is a chart showing the spectral reflection characteristic of the antireflection multilayer film in accordance with Comparative Example 3; and FIG. 11 is a chart showing the spectral reflection characteristic of the barrier layer and antireflection multilayer film in accordance with Comparative Example 4.

DESCRIPTION OF THE PREFERRED EMBODIMENTS

In the following, embodiments of the optical device, optical system, and projector apparatus in accordance with the present invention will be explained with reference to the drawings.

Figure 2:
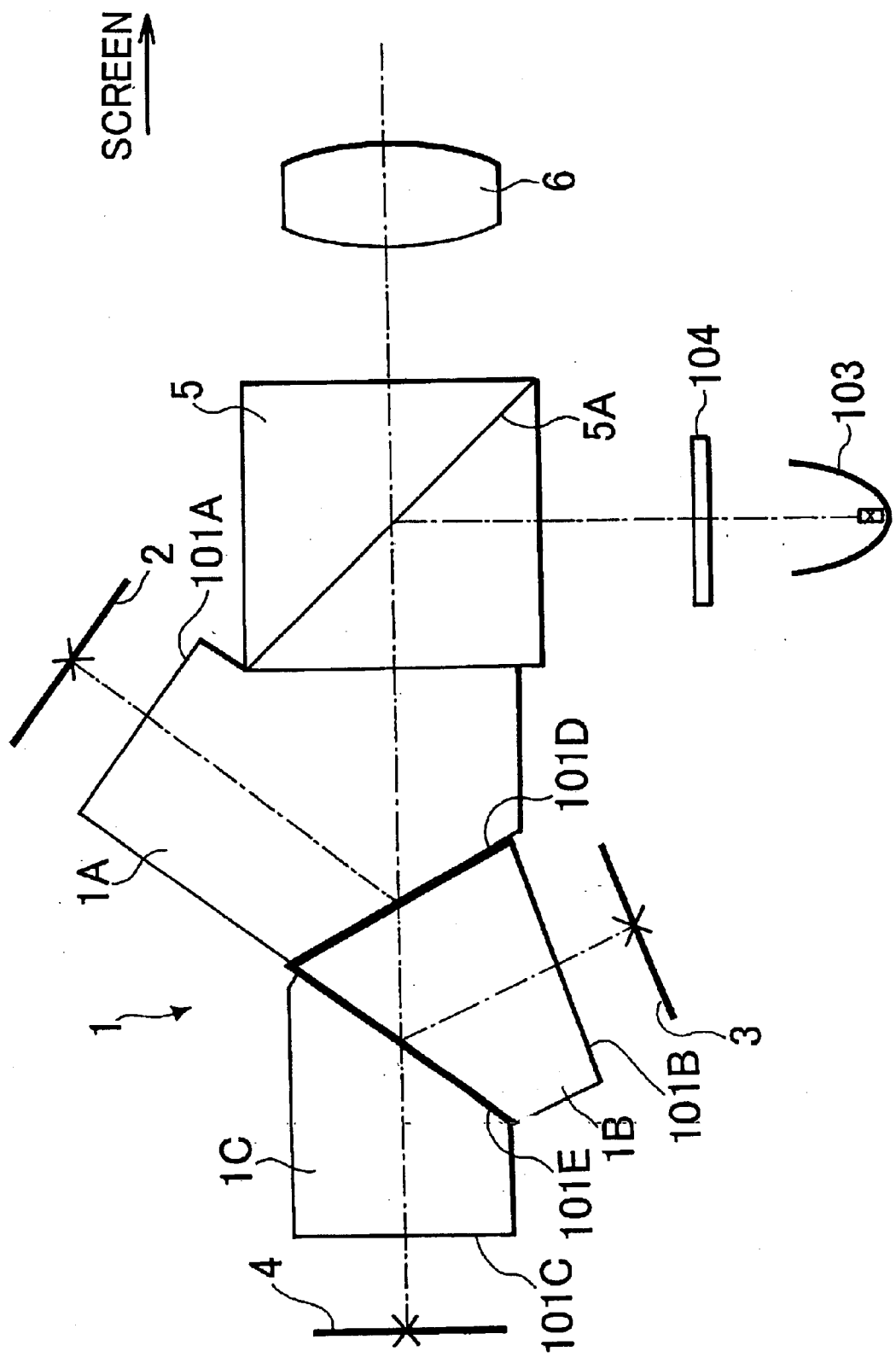
FIG. 2 is a schematic plan view showing an optical system equipped with the optical device in a projector apparatus in accordance with an embodiment of the present invention.

FIG. 2 is a schematic plan view showing an optical system equipped with an optical device in a projector apparatus in accordance with an embodiment of the present invention. The optical device, optical system, and projector apparatus in this case are constituted by a color-decomposing/combining prism, an illumination optical system, and a reflection type projector apparatus, respectively. A dichroic multilayer film and a barrier film are interposed between each pair of prism elements in the color-decomposing/combining prism, which will be explained later in detail.

In FIG. 2, illumination light outputted as nonpolarized white light from a light source 103 is arranged into predetermined S-polarized light by a polarizing plate 104, and then is made incident on a polarization beam splitter 5. Here, the light source 103 is equipped with a reflector for efficiently utilizing light. Examples of the light source 103 used include metal halide lamps, xenon lamps, tungsten halogen lamps, and the like.

Since the illumination light incident on the polarization beam splitter 5 is S-polarized light, it is reflected by a polarization separating surface 5A, so as to be made incident on a color-decomposing/combining prism 1 joined to the polarization beam splitter 5.

The color-decomposing/combining prism 1 is constituted by three prism elements 1A, 1B, 1C in combination. Namely, successively from the polarization beam splitter 5 side, the first prism element 1A, second prism element 1B, and third prism element 1C are arranged along the optical axis. The first prism element 1A and second prism element 1B are joined to each other by way of a first dichroic/barrier layer 101D adapted to reflect only a green color light component. The second prism element 1B and third prism element 1C are joined to each other by way a second dichroic/barrier layer 101E adapted to reflect a red color light component but transmit a blue color light component therethrough. As a consequence, a luminous flux entering the color-decomposing/combining prism 1 from the first prism element 1A is decomposed into three primary color light components of B, R, G, which are then emitted from optical I/O end faces 101A, 101B, 101C of the prism elements 1A, 1B, 1C corresponding thereto. Thus emitted color light components irradiate reflection type liquid crystal display panels 2, 3, 4 corresponding thereto, and reenter the optical I/O end faces 101A, 101B, 101C of their corresponding prism elements 1A, 1B, 1C while in a state carrying respective object image information items of color light components formed on the liquid crystal display panels 2, 3, 4.

Thereafter, the respective color light components caused to carry object image information items by the reflection type liquid crystal display panels 2, 3, 4 displaying the object images of respective color light components are guided through entrance optical paths toward the respective reflection type liquid crystal display panels 2, 3, 4 and then are combined by the color-decomposing/combining prism 1. Thus combined light passes through the polarization separating surface 5A of the polarization beam splitter 5, whereby a desirable color object image is projected by a projection lens 6 onto a screen under magnification.

Here, since the S-polarized light incident on each of the reflection type liquid crystal display panels 2, 3, 4 is converted into P-polarized light, the return light from the display panels 2, 3, 4 passes through the polarization separating surface 5A of the polarization beam splitter 5.

As mentioned above, the first prism element 1A and second prism element 1B are joined to each other by way of the first dichroic/barrier layer 101D adapted to reflect the green color light component alone, whereas the second prism element 1B and third prism element 1C are joined to each other by way of the second dichroic/barrier layer 101E adapted to reflect the red color light component but transmit the blue color light component therethrough.

Figure 1:
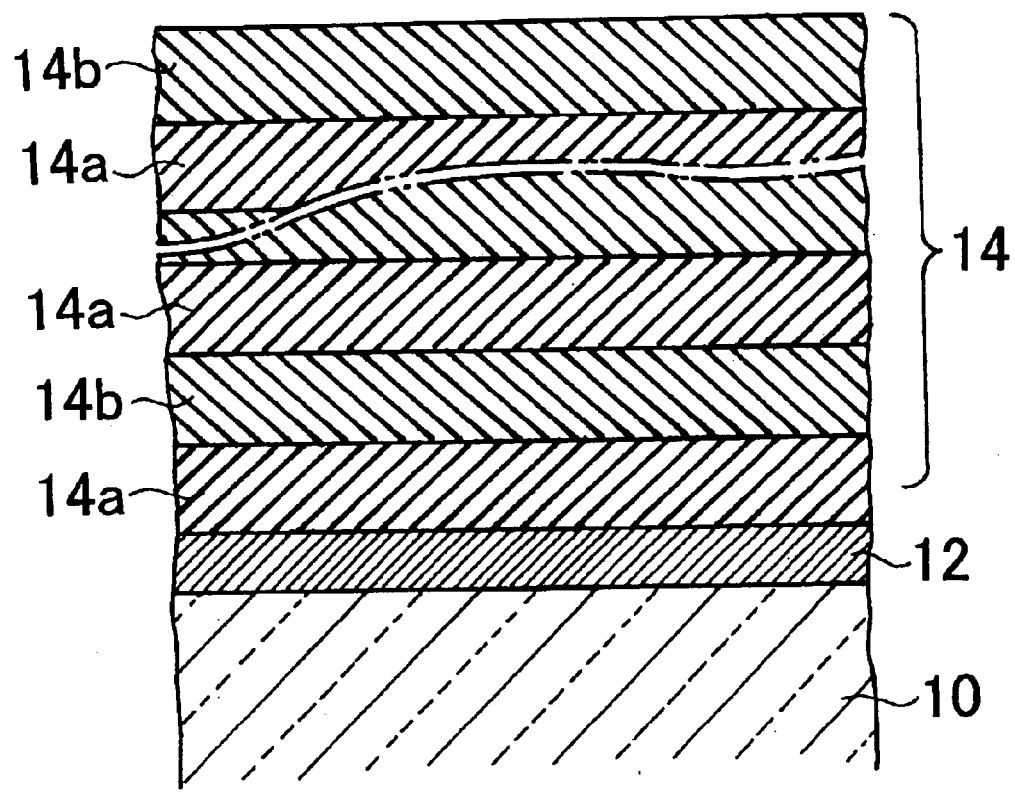
FIG. 1 is a sectional view for schematically explaining a layer configuration of the optical device in accordance with an embodiment of the present invention.

Their layer configuration is schematically shown in FIG. 1 as being formed on one prism substrate for convenience of explanation.

Namely, each dichroic/barrier layer comprises a barrier layer 12 and a dichroic multilayer film 14 which are laminated on a prism substrate 10.

Here, the prism substrate 10 contains a large amount of PbO, thereby exhibiting a high refractive index (at a reference wavelength of 632.8 nm, ditto in the following) of $1.7 \leq N_s \leq 1.9$. Preferably, the PbO content is at least 50% by weight, whereby the refractive index N, in this case falls within the range of $1.8 \leq N_s \leq 1.9$.

It is necessary for the barrier layer 12 to have a refractive index $N_b$ (at a reference wavelength of 632.8 nm, ditto in the following) falling within the range of $-0.1 \leq N_s \leq 0.1$. Also, it is required to have a composition which is not chemically reactive with the prism substrate 10 while exhibiting a high filling factor $\rho$ ($\rho > 0.95$). Here, $N_b - N_s$ preferably has an absolute value as small as possible, and preferably falls within the range of ±0.05.

Suitable as the barrier layer 12 is $La_{2x}Al_{2y}O_{3(x+y)}$ (product name: Substance M3 Patinal (registered trademark) manufactured by Merck and Co., Inc.), where x and y satisfy $0.5 \leq x$, and $y \leq 1.5$.

The above-mentioned $La_{2x}Al_{2y}O_{3(x+y)}$ can easily form a film satisfying the refractive index falling within the range of $-0.1 \leq N_s \leq 0.1$ and the filling factor of $\rho \geq 0.95$ by vapor deposition (or ion plating or the like). Here, La is necessary for raising the refractive index $N_b$ of the barrier layer 12, and is excellent in that it does not adversely affect optical characteristics at all. The barrier layer can attain a desirable refractive index $N_b$ by choosing the values of x and y.

The dichroic multilayer film 14 is constituted by 12 layers, for example, in total of alternately laminated $TiO_2$ layers 14a and $SiO_2$ layers 14b.

Providing thus configured barrier layer 12 in this embodiments can inhibit Pb molecules contained in the prism substrate 10 from diffusing into the dichroic multilayer film 14, prevent the Pb molecules from reacting with Ti molecules in $TiO_2$ constituting the dichroic multilayer film 14, and stop the optical absorption index of the dichroic multilayer film 14 from rising due to the blackening of $TiO_2$.

Also, since the refractive index of the barrier layer 12 is caused to have a refractive index very close to that of the prism substrate 10, spectral and phase difference characteristics can be maintained favorably without reducing its film thickness, whereby an optical device having favorable optical characteristics can be obtained without losing functions inherent in the barrier layer 12.

The barrier layer 12 and dichroic multilayer film 14 may be designed independently from each other, whereby the time required for development and designing can be saved, and the manufacturing cost can be lowered. Also, the degree of freedom in film design increases.

The optical device, optical system, and projector apparatus in accordance with the present invention can be modified in various manners without being restricted to those of the above-mentioned embodiment. For example, the composition constituting the barrier layer 12 is not restricted to $La_{2x}Al_{2y}O_{3(x+y)}$, whereas various other compositions can be selected as long as they can make the refractive index of the barrier layer 12 close to that of the light-transmitting optical substrate without adversely affecting optical characteristics thereof.

Preferable as the light-transmitting optical substrate is one having a low photoelastic coefficient and a low optical absorption index in order to maintain a favorable polarizing state. Specifically, not only those containing a large amount of PbO, but also those containing a large amount of $Nb_2O_5$ or $TiO_2$ are preferred. The content of $Nb_2O_5$ or $TiO_2$ is preferably at least 50% by weight as in the case of PbO.

The type of multilayer film in the optical device of the present invention is not restricted in particular. The present invention is applicable not only to the above-mentioned dichroic multilayer film, but also to antireflection multilayer films and the like as a matter of course.

EXAMPLES

Example 1

On a glass substrate 10 using PBH55 (product name) containing a large amount of PbO, $La_{2x}Al_{2y}O_{3(x+y)}$ (product name: Substance M3 Patinal (registered trademark) manufactured by Merck and Co., Inc.) having a film thickness of 87 nm was formed as a barrier layer 12, on which a dichroic multilayer film 14 having 12 layers ($TiO_2/SiO_2$ alternate layers) was formed. The barrier layer 12 and dichroic multilayer film 14 were formed by using vapor deposition. The temperature of glass substrate 10 was 300° C. Here, the refractive index of glass substrate 10 was 1.84, the refractive index of barrier layer 12 was 1.84, and the refractive indices of $TiO_2$ layer 14a and $SiO_2$ layer 14b in the dichroic multilayer film 14 were 2.30 and 1.47, respectively. Table 1 shows the refractive index and thickness of each film.

In thus formed optical device, no reaction between Pb and $TiO_2$ was seen, whereas optical absorption was substantially zero within the film.

Figure 3:
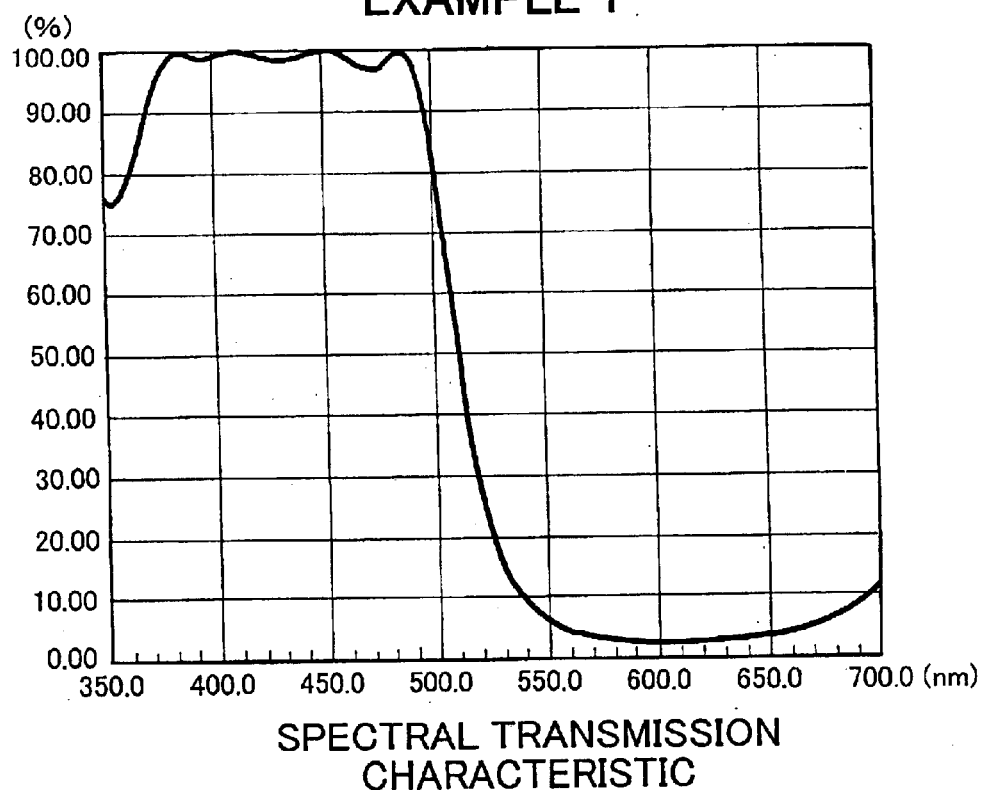
FIG. 3 is a chart showing the spectral transmission characteristic of the barrier layer and dichroic multilayer film in accordance with Example 1 of the present invention.
Figure 4:
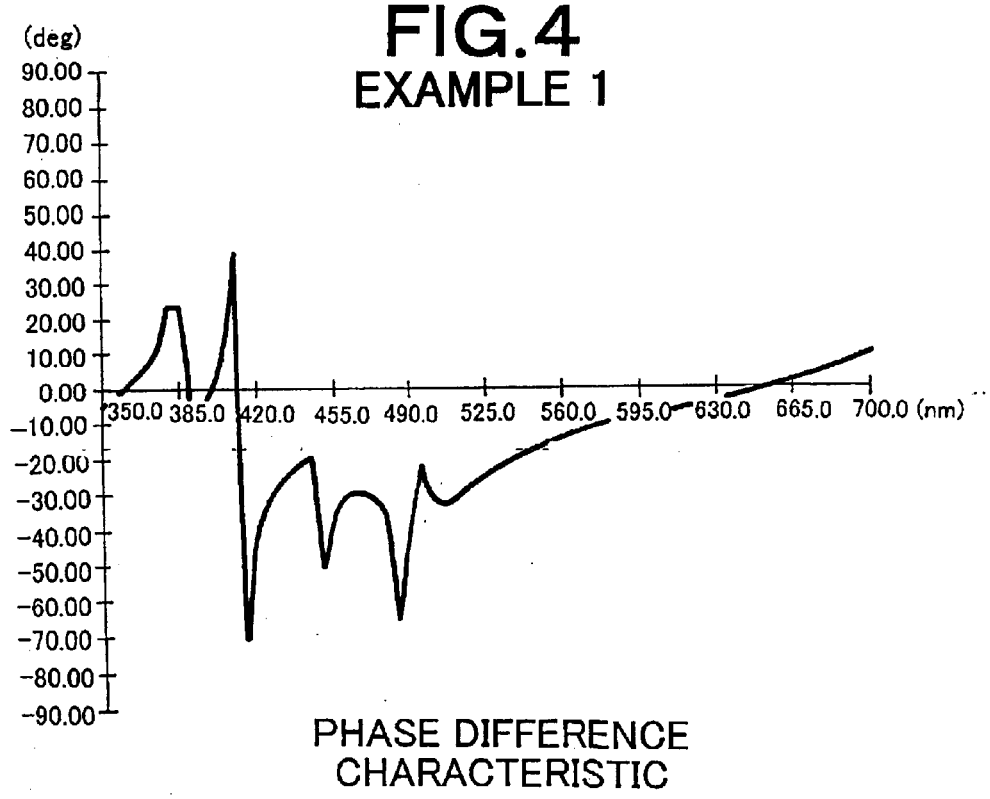
FIG. 4 is a chart showing the phase difference characteristic of reflected light in the barrier layer and dichroic multilayer film in accordance with Example 1 of the present invention.

FIGS. 3 and 4 show the spectral transmission characteristic (p-polarized light quantity+s-polarized light quantity)/2 at an incident angle of 30°) of the barrier layer 12 and dichroic multilayer film 14 and the phase difference characteristic of reflected light therein, respectively. The spectral transmission characteristic and the phase difference characteristic of reflected light were favorable.

Example 2

On a glass substrate 10 using PBH55 (product name) containing a large amount of PbO, $La_{2x}Al_{2y}O_{3(x+y)}$ (product name: Substance M3 Patinal (registered trademark) manufactured by Merck and Co., Inc.) having a film thickness of 100 nm was formed as a barrier layer 12, on which an antireflection multilayer film 14 having 4 layers ($TiO_2/SiO_2$ alternate layers) was formed. The barrier layer 12 and antireflection multilayer film 14 were formed by using vapor deposition. The temperature of glass substrate 10 was 300° C. Here, the refractive index of glass substrate 10 was 1.84, the refractive index of barrier layer 12 was 1.82, and the refractive indices of $TiO_2$ layer 14a and $SiO_2$ layer 14b in the antireflection multilayer film 14 were 2.30 and 1.47, respectively. Table 2 shows the refractive index and thickness of each film.

In thus formed optical device, no reaction between Pb and $TiO_2$ was seen, whereas optical absorption was substantially zero within the film.

Figure 5:
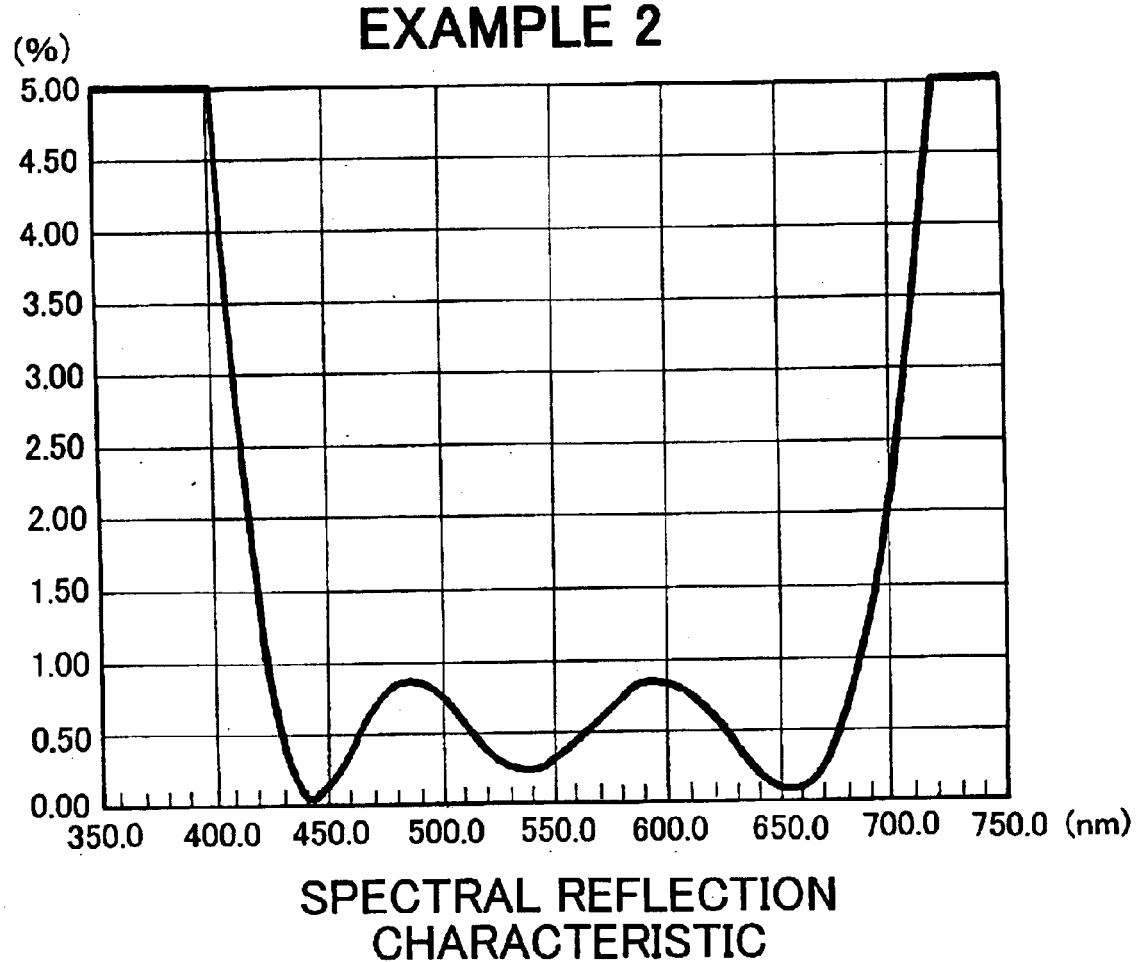
FIG. 5 is a chart showing the spectral reflection characteristic of the barrier layer and dichroic multilayer film in accordance with Example 2 of the present invention.

FIG. 5 shows the spectral transmission characteristic (p-polarized light quantity+s-polarized light quantity)/2 at an incident angle of 0°) of the barrier layer 12 and antireflection multilayer film 14. The spectral transmission characteristic was favorable.

Comparative Example 1

On a glass substrate 10 using PBH55 (product name) containing a large amount of PbO, a dichroic multilayer film 14 having 12 layers ($TiO_2/SiO_2$ alternate layers) was formed with no barrier layer 12 formed on the glass substrate 10. The dichroic multilayer film 14 was formed by using vapor deposition. The temperature of glass substrate 10 was 300° C. Here, the refractive index of glass substrate 10 was 1.84, whereas the refractive indices of $TiO_2$ layer 14a and $SiO_2$ layer 14b in the dichroic multilayer film 14 were 2.30 and 1.47, respectively. Table 3 shows the refractive index and thickness of each film.

Thus formed optical device was installed in a projector apparatus and irradiated with illumination light. After about 1 to 10 hours, it was seen that Pb molecules diffused into the $TiO_2$ layers 14a, whereby the blackening of $TiO_2$ caused by a reaction therebetween was observed. Also, optical absorption within the film was seen.

The spectral transmission characteristic (p-polarized light quantity+s-polarized light quantity)/2 at an incident angle of 30°) of the dichroic multilayer film 14 and the phase difference characteristic of reflected light therein were optimized as shown in FIGS. 6 and 7, respectively.

Comparative Example 2

On a glass substrate 10 using PBH55 (product name) containing a large amount of PbO, $SiO_2$ was formed as a barrier layer 12, on which a dichroic multilayer film 14 having 12 layers ($TiO_2/SiO_2$ alternate layers) was formed.

The barrier layer 12 and dichroic multilayer film 14 were formed by using vapor deposition. The temperature of glass substrate 10 was 300° C. Here, the refractive index of glass substrate 10 was 1.84, the refractive index of barrier layer 12 was 1.47, and the refractive indices of $TiO_2$ layer 14a and $SiO_2$ layer 14b in the dichroic multilayer film 14 were 2.30 and 1.47, respectively. Table 4 shows the refractive index and thickness of each film.

Figure 8:
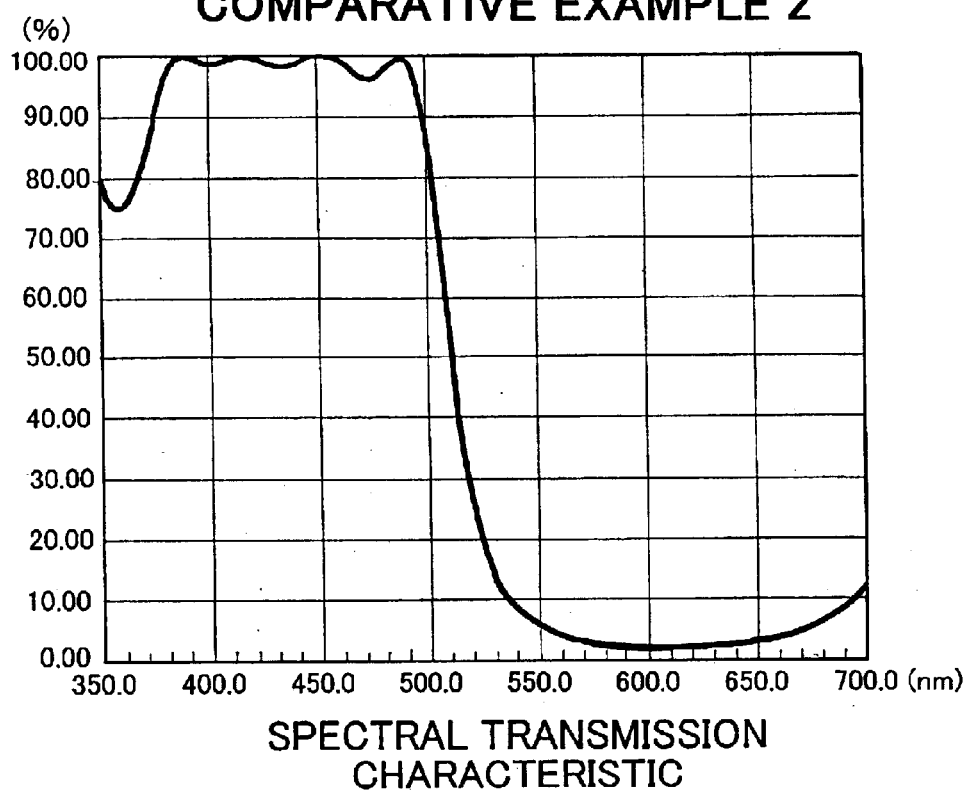
FIG. 8 is a chart showing the spectral transmission characteristic of the barrier layer and dichroic multilayer film in accordance with Comparative Example 2.
Figure 9:
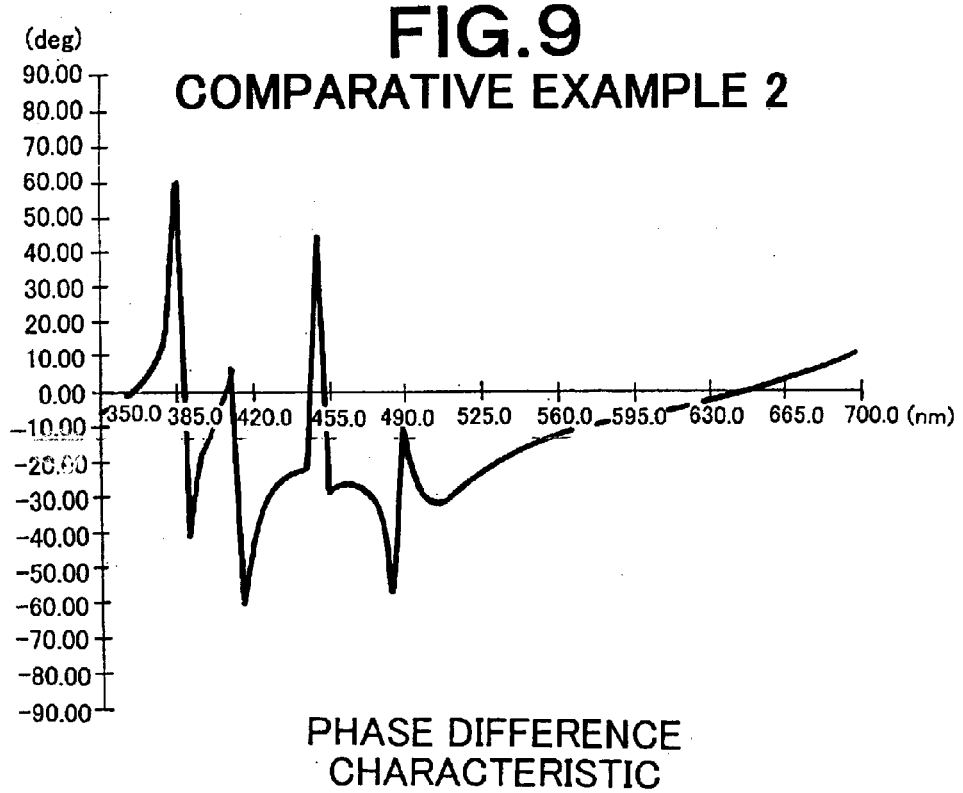
FIG. 9 is a chart showing the phase difference characteristic of reflected light in the barrier layer and dichroic multilayer film in accordance with Comparative Example 2.

Here, each film thickness was set so as to optimize the spectral transmission characteristic (p-polarized light quantity+s-polarized light quantity)/2 at an incident angle of 30°) of the barrier layer 12 and dichroic multilayer film 14 and the phase difference characteristic of reflected light therein. The spectral transmission characteristic of the barrier layer 12 and dichroic multilayer film 14 and the phase difference characteristic of reflected light therein were favorable as shown in FIGS. 8 and 9, respectively.

However, since the spectral transmission characteristic and phase difference characteristic of reflected light were optimized, the $SiO_2$ layer constituting the barrier layer 12 has a film thickness of about 17 nm, whereby the barrier layer 12 could not fully exhibit functions inherent therein, whereas its film thickness was hard to control.

Comparative Example 3

On a glass substrate 10 using PBH55 (product name) containing a large amount of PbO, an antireflection multilayer film 14 having 4 layers ($TiO_2/SiO_2$ alternate layers) was formed. The antireflection multilayer film 14 was formed, by using vapor deposition. The temperature of glass substrate 10 was 300° C. Here, the refractive index of glass substrate 10 was 1.84, whereas the refractive indices of $TiO_2$ layer 14a and $SiO_2$ layer 14b in the antireflection multilayer film 14 were 2.30 and 1.47, respectively. Table 5 shows the refractive index and thickness of each film.

Thus formed optical device was installed in a projector apparatus and irradiated with illumination light. After about 1 to 10 hours, it was seen that Pb molecules diffused into the $TiO_2$ layers 14a, whereby the blackening of $TiO_2$ caused by a reaction therebetween was observed. Also, optical absorption within the film was seen.

FIG. 10 shows the spectral transmission characteristic (p-polarized light quantity+s-polarized light quantity)/2 at an incident angle of 0°) of the antireflection multilayer film 14. The spectral reflection characteristic was favorable.

Comparative Example 4

On a glass substrate 10 using PBH55 (product name) containing a large amount of PbO, an $SiO_2$ layer was formed as a barrier layer 12, on which an antireflection multilayer film 14 having 4 layers ($TiO_2/SiO_2$ alternate layers) was formed. The barrier layer 12 and antireflection multilayer film 14 were formed by using vapor deposition. The temperature of glass substrate 10 was 300° C. Here, the refractive index of glass substrate 10 was 1.84, the refractive index of barrier layer 12 was 1.47, and the refractive indices of $TiO_2$ layer 14a and $SiO_2$ layer 14b in the antireflection multilayer film 14 were 2.30 and 1.47, respectively. Table 6 shows the refractive index and thickness of each film.

Here, each film thickness was set so as to optimize the spectral transmission characteristic (p-polarized light quantity+s-polarized light quantity)/2 at an incident angle of 30°) of the barrier layer 12 and antireflection multilayer film 14. The spectral transmission characteristic of the barrier layer 12 and antireflection multilayer film 14 was favorable as shown in FIG. 11.

However, since the spectral reflection characteristic was optimized, the $SiO_2$ layer constituting the barrier layer 12 has a film thickness of about 6 nm, whereby the barrier layer 12 could not fully exhibit functions inherent therein, whereas its film thickness was hard to control.

As explained in the foregoing, as an optical device in which a multilayer film such as a dichroic film is formed on a light-transmitting optical substrate provided with a barrier layer, the optical device having a barrier layer in accordance with the present invention defines the refractive index range of the barrier layer with respect to the refractive index of the light-transmitting optical substrate, thereby making it possible to attain an optical device having excellent spectral and phase difference characteristics and favorable optical characteristics while securing a function of inhibiting Pb and the like within the light-transmitting optical substrate from diffusing into the multilayer film and then reacting with constituents of the multilayer film, so that the optical absorption index of the multilayer film is stopped from rising.

Further, the barrier layer and dichroic multilayer film can be designed independently from each other, whereby the time required for development and designing can be saved, and the manufacturing cost can be lowered.

The optical system and projector apparatus of the present invention can attain similar effects since they are equipped with the optical device having a barrier layer in accordance with the present invention.

TABLE 1

|    | N    | d     |                |
|----|------|-------|----------------|
|    | 1.84 |       | glass substrate |
|    | 1.84 | 87.1  | barrier layer  |
| 1  | 2.30 | 70.2  | $TiO_2$        |
| 2  | 1.47 | 125.1 | $SiO_2$        |
| 3  | 2.30 | 61.9  | $TiO_2$        |
| 4  | 1.47 | 111.1 | $SiO_2$        |
| 5  | 2.30 | 67.5  | $TiO_2$        |
| 6  | 1.47 | 108.2 | $SiO_2$        |
| 7  | 2.30 | 59.2  | $TiO_2$        |
| 8  | 1.47 | 120.3 | $SiO_2$        |
| 9  | 2.30 | 64.7  | $TiO_2$        |
| 10 | 1.47 | 96.2  | $SiO_2$        |
| 11 | 2.30 | 77.0  | $TiO_2$        |
| 12 | 1.47 | 33.1  | $SiO_2$        |

TABLE 2

|    | N    | d     |                       |
|----|------|-------|-----------------------|
|    | 1.84 |       | glass substrate       |
|    | 1.82 | 100.0 | barrier layer ($SiO_2$) |
| 1  | 2.30 | 110.3 | $TiO_2$               |
| 2  | 1.47 | 167.4 | $SiO_2$               |
| 3  | 2.30 | 100.6 | $TiO_2$               |
| 4  | 1.47 | 73.4  | $SiO_2$               |

TABLE 3

|    | N    | d     |                 |
|----|------|-------|-----------------|
|    | 1.84 |       | glass substrate |
| 1  | 2.30 | 70.2  | $TiO_2$         |
| 2  | 1.47 | 125.1 | $SiO_2$         |
| 3  | 2.30 | 61.9  | $TiO_2$         |
| 4  | 1.47 | 111.1 | $SiO_2$         |
| 5  | 2.30 | 67.5  | $TiO_2$         |
| 6  | 1.47 | 108.2 | $SiO_2$         |
| 7  | 2.30 | 59.2  | $TiO_2$         |

TABLE 3-continued

| | N | d | |
|---|---|---|---|
| 8 | 1.47 | 120.3 | SiO$_2$ |
| 9 | 2.30 | 64.7 | TiO$_2$ |
| 10 | 1.47 | 96.2 | SiO$_2$ |
| 11 | 2.30 | 77.0 | TiO$_2$ |
| 12 | 1.47 | 33.1 | SiO$_2$ |

TABLE 4

| | N | d | |
|---|---|---|---|
| | 1.84 | | glass substrate |
| | 1.47 | 17.6 | barrier layer (SiO$_2$) |
| 1 | 2.30 | 80.1 | TiO$_2$ |
| 2 | 1.47 | 123.0 | SiO$_2$ |
| 3 | 2.30 | 59.4 | TiO$_2$ |
| 4 | 1.47 | 114.4 | SiO$_2$ |
| 5 | 2.30 | 66.4 | TiO$_2$ |
| 6 | 1.47 | 110.4 | SiO$_2$ |
| 7 | 2.30 | 57.4 | TiO$_2$ |
| 8 | 1.47 | 122.4 | SiO$_2$ |
| 9 | 2.30 | 63.3 | TiO$_2$ |
| 10 | 1.47 | 98.6 | SiO$_2$ |
| 11 | 2.30 | 76.0 | TiO$_2$ |
| 12 | 1.47 | 35.1 | SiO$_2$ |

TABLE 5

| | N | d | |
|---|---|---|---|
| | 1.84 | | glass substrate |
| 1 | 2.30 | 110.3 | TiO$_2$ |
| 2 | 1.47 | 167.4 | SiO$_2$ |
| 3 | 2.30 | 100.6 | TiO$_2$ |
| 4 | 1.47 | 73.4 | SiO$_2$ |

TABLE 6

| | N | d | |
|---|---|---|---|
| | 1.84 | | glass substrate |
| | 1.47 | 6.1 | barrier layer (SiO$_2$) |

TABLE 6-continued

| | N | d | |
|---|---|---|---|
| 1 | 2.30 | 113.9 | TiO$_2$ |
| 2 | 1.47 | 167.6 | SiO$_2$ |
| 3 | 2.30 | 100.3 | TiO$_2$ |
| 4 | 1.47 | 73.6 | SiO$_2$ |

What is claimed is:

1. An optical device comprising a light-transmitting optical substrate formed with a multilayer film and a barrier layer disposed on said multilayer film side thereof;

wherein said light-transmitting optical substrate has a refractive index $N_s$ (at a reference wavelength of 632.8 nm) falling within the range of $1.7 \leq N_s \leq 1.9$; and wherein said barrier layer has a refractive index $N_b$ (at a reference wavelength of 632.8 nm) falling within the range of $-0.1 \leq N_b - N_s \leq 0.1$.

2. An optical device according to claim 1, wherein said barrier layer is constituted by $La_{2x}Al_{2y}O_{3(x+y)}$, where $0.5 \leq x$, and $y \leq 1.5$.

3. An optical device according to claim 1, wherein said barrier layer has a physical film thickness of at least 20 nm.

4. An optical device according to claim 1, said light-transmitting optical substrate is constituted by a glass material containing at least 50% by weight of at least one of PbO, $Nb_2O_5$, and $TiO_2$.

5. An optical device according to claim 1, wherein the value of $N_b - N_s$ falls within the range of ±0.05.

6. An optical device according to claim 1, wherein said multilayer film comprises alternately laminated TIO$_2$ and SiO$_2$ layers.

7. An optical system comprising the optical device according to claim 1.

8. An optical system according to claim 7, wherein said multilayer film is a dichroic film.

9. A projector apparatus comprising the optical device according to claim 1.

10. An optical system according to claim 9, wherein said multilayer film is a dichroic film.

* * * * *